(12) United States Patent
He et al.

(10) Patent No.: US 11,251,907 B2
(45) Date of Patent: *Feb. 15, 2022

(54) CONTENTION WINDOW SIZE ADAPTATION

(71) Applicant: Apple Inc., Cupertino, CA (US)

(72) Inventors: Hong He, Beijing (CN); Hwan-Joon Kwon, Santa Clara, CA (US); Seunghee Han, San Jose, CA (US); Abhijeet Bhorkar, Fremont, CA (US); Jeongho Jeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/921,357

(22) Filed: Jul. 6, 2020

(65) Prior Publication Data
US 2020/0403733 A1 Dec. 24, 2020

Related U.S. Application Data

(63) Continuation of application No. 15/760,010, filed as application No. PCT/US2016/024455 on Mar. 28, 2016, now Pat. No. 10,708,000.
(Continued)

(51) Int. Cl.
*H04L 1/16* (2006.01)
*H04L 1/18* (2006.01)
(Continued)

(52) U.S. Cl.
CPC .......... *H04L 1/1657* (2013.01); *H04L 1/0001* (2013.01); *H04L 1/1692* (2013.01);
(Continued)

(58) Field of Classification Search
None
See application file for complete search history.

(56) References Cited

U.S. PATENT DOCUMENTS 9,949,164 B2 4/2018 Heo et al.
2013/0308593 A1 11/2013 Takeda et al.
(Continued)

OTHER PUBLICATIONS

"LAA contention window size adjustment with HARQ-ACK." Source: Sharp. Agenda Item: 7.2.3.1. 3GPP TSG RAN WG1 Meeting #82bis, Malmoe, Sweden, Oct. 5-9, 2015. R1-155566. 6 pages.
(Continued)

*Primary Examiner* — Alpus Hsu
*Assistant Examiner* — Camquyen Thai
(74) *Attorney, Agent, or Firm* — Eschweiler & Potashnik, LLC

(57) ABSTRACT

Techniques for contention window size (CWS) adaptation (CWSA) are discussed. One example apparatus can comprise a processor that can receive HARQ messages UEs in response to PDSCH transmissions in one or more reference subframes. The HARQ messages can comprise HARQ-ACK values that denote a HARQ-ACK state for a transport block associated with License Assisted Access (LAA) operation, wherein each of the HARQ-ACK states is one of a DTX state, an ACK state, a NACK state, or an "any" state. The processor can also; determine a metric value for each of the HARQ-ACK states; calculate a CWS adjustment metric based on the determined metric values; increase a CWS to a next higher allowed value when the CWS adjustment metric is greater than or equal to a threshold; and reset the CWS to a minimum allowed value when the CWS adjustment metric is less than the threshold.

30 Claims, 6 Drawing Sheets

Related U.S. Application Data

(60) Provisional application No. 62/243,984, filed on Oct. 20, 2015.

(51) Int. Cl.
  *H04W 74/08* (2009.01)
  *H04L 1/00* (2006.01)
  *H04W 76/28* (2018.01)
  *H04W 16/14* (2009.01)
  *H04W 88/08* (2009.01)

(52) U.S. Cl.
  CPC .......... *H04L 1/1812* (2013.01); *H04L 1/1867* (2013.01); *H04W 74/08* (2013.01); *H04W 16/14* (2013.01); *H04W 76/28* (2018.02); *H04W 88/08* (2013.01)

(56) References Cited

U.S. PATENT DOCUMENTS

| | | |
|---|---|---|
| 2014/0269452 A1 | 9/2014 | Papasakellariou |
| 2015/0078284 A1 | 3/2015 | Lee et al. |
| 2015/0264678 A1 | 9/2015 | Yin et al. |
| 2016/0037524 A1 | 2/2016 | Krzymien et al. |
| 2016/0212764 A1 | 7/2016 | Yin et al. |
| 2016/0338054 A1 | 11/2016 | Oh et al. |
| 2016/0366615 A1 | 12/2016 | Batchu et al. |
| 2017/0005768 A1* | 1/2017 | Yin ........................ H04L 1/1867 |
| 2017/0055296 A1 | 2/2017 | Cheng et al. |
| 2017/0111931 A1 | 4/2017 | Damnjanovic et al. |
| 2017/0188387 A1 | 6/2017 | Mukherjee et al. |
| 2018/0152267 A1* | 5/2018 | Andreoli-Fang ......... H04L 1/08 |

OTHER PUBLICATIONS

"Triggering mechanism for contention window size adaptation." Source: Huawei, HiSilicon. Agenda Item: 7.2.4.1. 3GPP TSG RAN WG1 Meeting #82, Beijing, China, Aug. 24-28, 2015. R1-153782. 4 pages.

"Study on Licensed-Assisted Access using LTE." Source: Ericsson, Qualcomm, Huawei. Agenda Item: 14.1.1. 3GPP TSG RAN Meeting #64. Sophia Antipolis, France, Jun. 10-13, 2014. RP-140770 revision of RP-140259. 7 pages.

LTE; Evolved Universal Terrestrial Radio Access (E-UTRA); Physical layer procedures (3GPP TS 36.213 version 12.7.0 Release 12). ETSI TS 136 213 V12.7.0 (Oct. 2015). 3GPP Lte Advanced. 243 pages.

International Search Report dated Aug. 3, 2016 for International Application PCT/US2016/024455.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. 87 pages.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. Annex B1. 125 pages.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. Annex B2. 54 pages.

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. Annex B3. 20 pages.

International Preliminary Report on Patentability dated Apr. 24, 2018 for International Application PT/US2016/024455.

Notice of Allowance dated Mar. 4, 2020 for U.S. Appl. No. 15/760,010.

Non-Final Office Action dated Nov. 18, 2019 for U.S. Appl. No. 15/760,010.

* cited by examiner

FIG. 2

PCell — HARQ-ACK(0)
Licensed Band

SCell — HARQ-ACK(1)
Licensed or Unlicensed Band

| HARQ-ACK(0) | HARQ-ACK(1) | $n^{(1)}_{PUCCH}$ | $b(0)b(1)$ |
|---|---|---|---|
| ACK | ACK | $n^{(1)}_{PUCCH,1}$ | 1,1 |
| ACK | NACK/DTX | $n^{(1)}_{PUCCH,0}$ | 1,1 |
| NACK/DTX | ACK | $n^{(1)}_{PUCCH,1}$ | 0,0 |
| NACK | NACK/DTX | $n^{(1)}_{PUCCH,0}$ | 0,0 |
| DTX | NACK/DTX | No Transmission | |

CONTENTION WINDOW SIZE ADAPTATION

REFERENCE TO RELATED APPLICATIONS

This application is a continuation of U.S. application Ser. No. 15/760,010 filed Mar. 14, 2018, which claims priority to International Patent Application No. PCT/US2016/024455 filed Mar. 28, 2016, which claims the priority to U.S. Provisional Application No. 62/243,984 filed Oct. 20, 2015, entitled "CONTENTION WINDOW SIZE ADAPTATION", the contents of which are herein incorporated by reference in their entirety.

FIELD

The present disclosure relates to wireless technology, and more specifically to techniques for a contention window size for unlicensed band transmission.

BACKGROUND

The demand for wireless broadband data in cellular networks is expected to persistently increase. To meet this demand, a new study item entitled "Study on Licensed Assisted Access using LTE" was approved by the Third Generation Partnership Project (3GPP) in the Radio Access Network (RAN) meeting #65 to utilize the unlicensed spectrum using Long Term Evolution (LTE)-Advanced (LTE-A) technology. The idea behind Licensed Assist Access (LAA) is to extend the LTE technology into unlicensed spectrum deployments, thus enabling operators and vendors to leverage existing or planned investments in LTE/EPC (evolved packet core) hardware in the radio and core network, while coexisting with other technologies and fulfilling the regulatory requirements.

The study focuses on LTE Carrier Aggregation configurations and architecture where one or more low power Secondary cell(s) (Scell(s)) (e.g., based on regulatory power limits) operates in an unlicensed spectrum and is either DL (downlink)-only (e.g., supplemental DL) or contains UL (uplink) and DL, where the PCell (Primary cell) operates in licensed spectrum with either LTE FDD (frequency division duplexing) or LTE TDD (time division duplexing) technology.

LTE employs a hybrid automatic-repeat-request (HARQ) protocol on physical layers to handle transmission errors. HARQ-ACK (acknowledgement) for a transport block (TB) or SPS release PDCCH (physical downlink control channel)/EPDCCH (enhanced PDCCH) with a given DCI (downlink control information) format for a serving cell has three states, namely, ACK (Acknowledgement), NACK (Negative Acknowledgement) and DTX (Discontinuous Transmission). The receiver uses an error-detection code, typically a Cyclic Redundancy Check (CRC), to detect if the received packet is in error or not. If no error is detected in the received data packet, the received data is declared error-free and the transmitter is notified by sending a positive acknowledgement (ACK). On the other hand, if an error is detected, the receiver notifies the transmitter via a feedback channel by sending a negative acknowledgement (NACK). "DTX" occurs when the UE (user equipment) misses the PDCCH and does not detect any PDSCH (physical downlink shared channel) scheduled by the eNB, for example, due to deep channel fade, a strong interference, etc.

BRIEF DESCRIPTION OF THE DRAWINGS

FIG. 2 is a diagram illustrating HARQ (hybrid automatic repeat request)-ACK (acknowledgement) feedback via PUCCH (physical uplink control channel) format 1b with channel selection, showing NACK (negative acknowledgement)/DTX (discontinuous transmission) states that can be considered by a contention window size (CWS) adjustment metric according to various aspects described herein.

DETAILED DESCRIPTION

Figure 1:
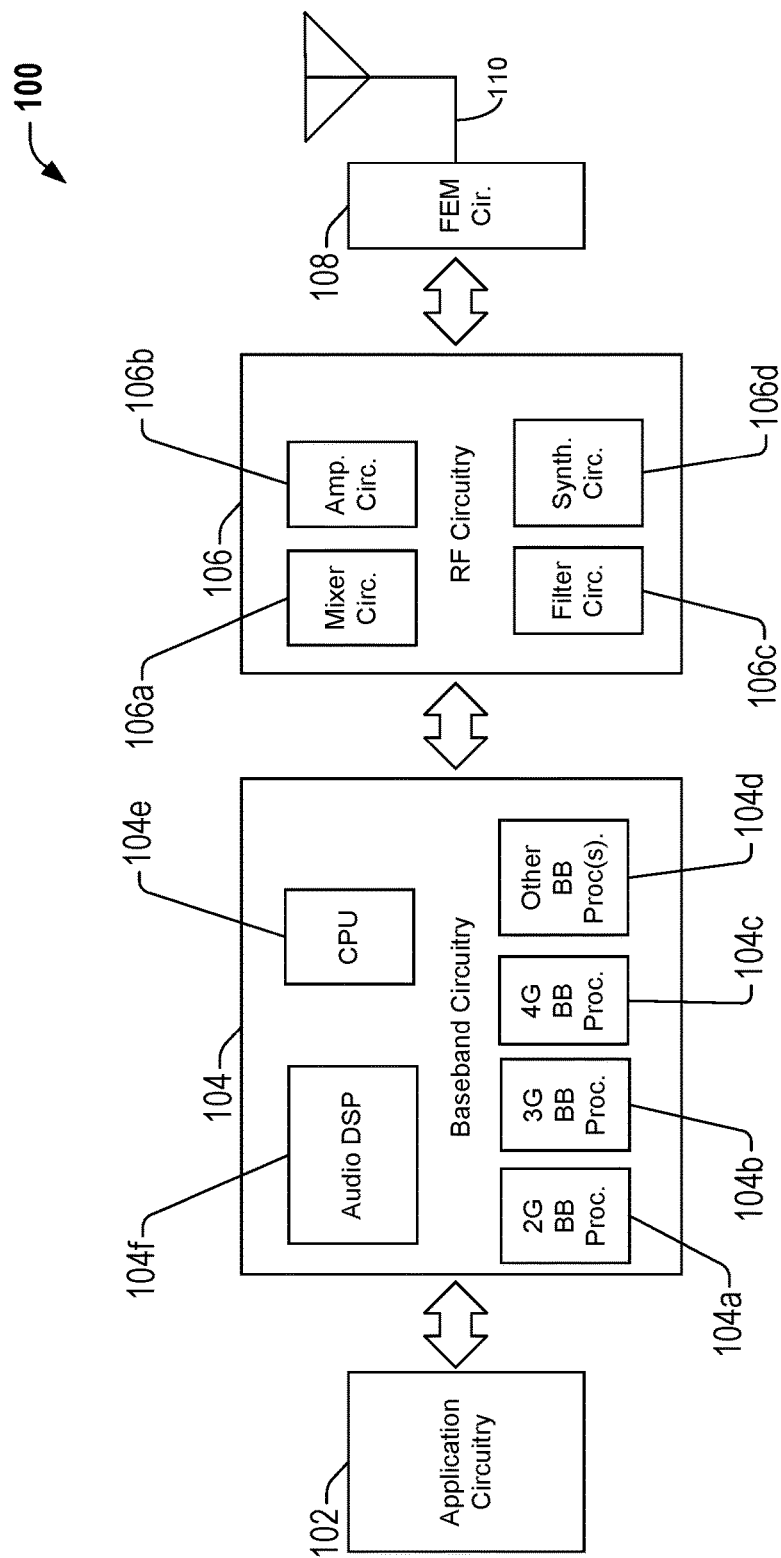
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with an Evolved NodeB (eNB).

Currently, two different methods to convey HARQ (hybrid automatic repeat request)-ACK (acknowledgement) feedback on PUCCH (physical uplink control channel) are configured for carrier aggregation (CA) in LTE (Long Term Evolution) by a UE (user equipment): PUCCH Format 1b with channel selection, or PUCCH Format 3.

Referring to FIG. 2, illustrated is a diagram of HARQ-ACK feedback via PUCCH format 1b with channel selection, showing NACK (negative acknowledgement)/DTX (discontinuous transmission) states that can be considered by the calculation of a contention window size (CWS) adjustment metric according to various aspects described herein. As can be seen in FIG. 2, for PUCCH format 1b with channel selection, a NACK and a DTX can be combined into a single state identified as "NACK/DTX" in a few cases. As an example in accordance with FIG. 2, a combined "NACK/DTX" state is applied for SCell (Secondary Cell) if there is at least one ACK state for other TB(s) on the PCell (Primary Cell); while NACK or DTX state is generated for PDSCH reception on the SCell for a given UE. In other words, if no PDCCH (physical downlink control channel) is detected or if a PDCCH is detected but PDSCH (physical downlink shared channel) is not received successfully for a SCell, the UE may indicate "NACK/DTX" for the SCell regardless of what value of HARQ-ACK state for PCell is. As can be seen in the example of FIG. 2, where a UE is configured with two CCs and PUCCH format 1b with channel selection for HARQ-ACK feedback in FDD system. In this example, the NACK and DTX states can be distinguished for a PCell in all cases except that the HARQ-ACK state for the SCell is "ACK", but are not necessarily distinguished for an SCell (secondary cell) in many cases, for example, when the UE reports (b(0)b(1)=(0,0)) via $n_{PUCCH,0}^{(1)}$.

In addition, no PUCCH is transmitted by a UE corresponding to some HARQ-ACK states combination (e.g., the "No transmission" item in FIG. 2). These "No transmission" HARQ-ACK states can be identified by an eNB employing a DTX detection mechanism include a list of states. These states that are detectable by implementing a DTX detection algorithm include at least: the all DTX states for PUCCH format 3 (e.g., {DTX, DTX, . . . , DTX}), and multiple states for PUCCH format 1b with channel selection as described below. For a FDD PUCCH cell and PUCCH format 1b with channel selection configuration for a given UE, these states include, for A=2, {DTX, NACK/DTX}; for A=3, all DTX (e.g., {DTX, DTX, . . . , DTX}); and for A=4, {DTX, DTX, NACK/DTX, NACK/DTX}. For a TDD PUCCH cell and PUCCH format 1b with channel selection configuration for a given UE, these states include, for A=2, {DTX, NACK/DTX}; for A=3, {DTX, NACK/DTX, NACK/DTX}); for A=4, {DTX, NACK/DTX, NACK/DTX, NACK/DTX}; for M=3, {<DTX, any, any>, <NACK/DTX, any, any>}; and for M=4, {<DTX, any, any, any>, <ACK, NACK/DTX, any, any>except for (ACK, DTX, DTX, DTX)} and {<DTX, any, any, any>, <NACK/DTX, any, any, any>}. As used above, M denotes the number of DL subframes that are associated with one UL subframe for HARQ-ACK feedback, A denotes the number of transport block across the CCs aggregated by a given UE, and the "any" state refers to potentially any of ACK/NACK/DTX state.

Listen-Before-Talk (LBT) procedures can be employed for fair and friendly coexistence of LAA with other operators and technologies operating in an unlicensed spectrum. Four channel access schemes were studied for LAA operations: Category 1: No LBT; Category 2: LBT without random back-off; Category 3: LBT with random back-off with a contention window of fixed size; and Category 4: LBT with random back-off with a contention window of variable size. For Category 4 LBT, in one design the CWS (Contention Window Size) can be increased if at least Z % (e.g., some threshold percentage) of the HARQ-ACK feedback values for a reference subframe set are NACK. Otherwise, the CWS can be reset to the minimum value (i.e., 15). How to treat HARQ-ACK DTX state for CWS adjustment is an important design consideration. The design goals include not only meeting the coexistence requirement but also maximizing the spectrum efficiency for unlicensed CCs deployed with LAA techniques. More specifically, an important design challenge is how to perform CWS adjustment in accordance with all the received HARQ-ACK states, including the combined "NACK/DTX" states, and the actual eNB scheduling status as well.

In various aspects discussed herein, a plurality of techniques are provided to implement CWS Adaptation (CWSA) based on HARQ-ACK states feedback. Various aspects discussed herein provide optional techniques for how to treat DTX states within HARQ-ACK feedback for CWS adjustment, for example, taking the current "NACK/DTX", "No transmission", "DTX" and "any" states of PUCCH feedback scheme into account.

In various aspects, several techniques are discussed herein for CWSA. In accordance with one or more of these techniques, HARQ-ACK-based CWSA mechanism can conditionally count NACK/DTX/any states based on one or more of the CA configuration (e.g., whether an unlicensed CC (component carrier) is cross-carrier scheduled by a licensed CC or not) or actual PDSCH scheduling status known at an eNB side. Alternatively, CWSA can count NACK/DTX/any states independently of CA configuration of PDSCH scheduling status aforementioned.

Figure 3:
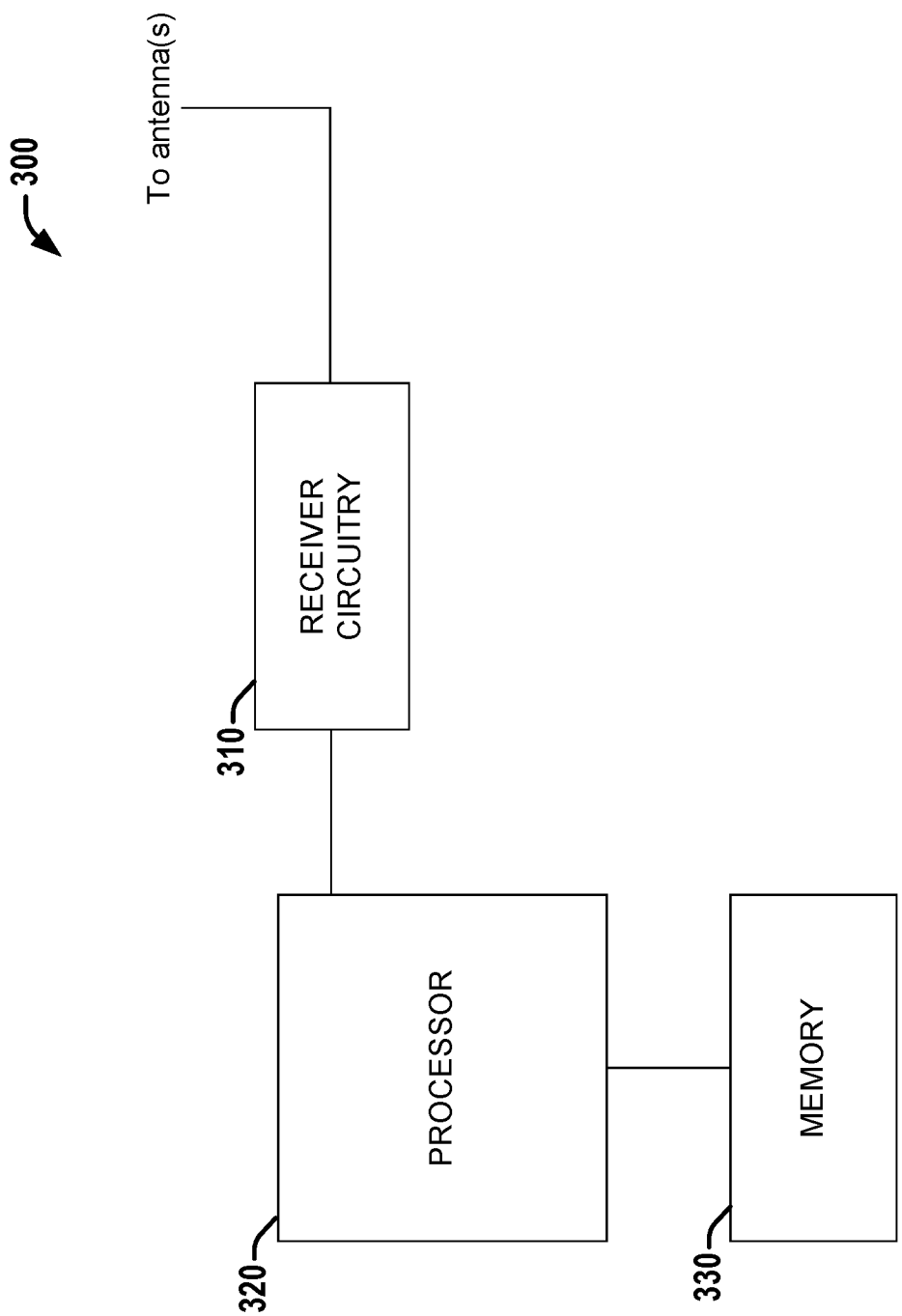
FIG. 3 is a block diagram illustrating a system employable in an Evolved NodeB (eNB) that facilitates adjustment of a contention window size (CWS) for license assisted access (LAA) operation according to various aspects described herein.

Referring to FIG. 3, illustrated is a block diagram of a system 300 that facilitates contention window size (CWS) adaptation (CWSA) according to various aspects described herein. System 300 can include optional receiver circuitry 310, a processor 320 (e.g., a baseband processor such as one of the baseband processors discussed in connection with FIG. 1), and memory 330 (which can comprise any of a variety of storage mediums and can store instructions and/or data associated with one or more of receiver circuitry 310 or processor 320, or transmitter circuitry 330). In various aspects, system 300 can be included within an Evolved Universal Terrestrial Radio Access Network (E-UTRAN) Node B (Evolved Node B, eNodeB, or eNB) or other base station in a wireless communications network. In some aspects, the receiver circuitry 310, the processor 320 and the memory 330 can be included in a single device, while in other aspects, they can be included in different devices, such as part of a distributed architecture. As described in greater detail below, system 300 can facilitate CWSA based on a CWS adjustment metric according to various aspects described herein.

Receiver circuitry 310 can receive one or more HARQ messages from one or more UEs, which can be in response to PDSCH transmission from one or more cells (e.g., from an eNB employing system 300, from one or more other cells, a combination thereof, etc.) during a set of reference subframes for implementing a CWSA mechanism. Each of the received HARQ messages can comprise one or more HARQ-ACK values, wherein each HARQ-ACK value can denote a HARQ-ACK state (e.g., ACK, NACK, DTX, "any") for an associated TB (e.g., a TB of a LAA transmission, etc.). These TBs can be TBs transmitted by one or more SCells on unlicensed band in connection with the LAA transmission.

In some aspects, the set of reference subframes can be a single subframe, for example, a starting subframe of a most recent transmission (e.g., an LAA transmission) on a given channel made by the eNB employing system 300 for which the HARQ messages were received. In other aspects, for example, when an LAA transmission is not aligned with a subframe boundary (e.g., begins in the second slot of a subframe, etc.), the set of reference subframes can be a starting subframe of that transmission (e.g., subframe k) and a next subframe of that transmission (e.g., subframe k+1). In further aspects, the set of reference subframes can comprise each subframe during which a portion of the LAA transmission is transmitted.

Processor 320 can receive the one or more HARQ-ACK messages (e.g., from the receiver circuitry 310), and can determine a metric value associated with a CWS adjustment metric for each of the HARQ-ACK states accordingly. Based on the assigned metric values, processor 320 can calculate the CWS adjustment metric, and can compare the calculated CWS adjustment metric to a threshold. When the CWS adjustment metric is greater than or equal to a threshold, processor 320 can increase the CWS (e.g., to a next higher allowed value), and when the CWS adjustment metric is less than the threshold, processor 320 can reset the CWS (e.g., to a minimum allowed value, e.g., 15, etc.).

In various aspects, processor 320 can assign each HARQ-ACK state one of two values for CWS adjustment metric calculation. For example, a first value (e.g., 0) can be associated with ACK states, and a second value (e.g., 1) can be associated with NACK states. In a first set of embodiments, processor 320 can assign the DTX states and 'any' states to have the same metric value as the metric value associated with the NACK states for HARQ-ACK values of HARQ messages that were received in response to PDSCH that was scheduled via PDCCH or EPDCCH transmitted on an unlicensed carrier (e.g., the same carrier that PDSCH was transmitted on, or potentially a distinct unlicensed carrier). In a second set of embodiments, processor 320 can assign the DTX and 'any' states to always have the same metric value as the metric value associated with the NACK states.

For HARQ messages with multiple HARQ-ACK values or values that apply to multiple subframes, processor 320 can consider each separately in calculating the CWS adjustment metric. For example, for HARQ messages responding to multiple codeword (e.g., two codewords, etc.) PDSCH transmissions, HARQ-ACK values associated with distinct codewords can each be considered separately in determining the CWS adjustment metric. As another example, for HARQ messages that denote bundled HARQ-ACK states across a plurality (e.g., M) subframes, those bundled HARQ-ACK states can be regarded the same as that same number (e.g., M) of distinct instances of that HARQ-ACK state when calculating the CWS adjustment metric.

In various aspects, processor 320 can calculate the CWS adjustment metric based on a ratio of a first quantity to a second quantity. The first quantity can be the number of NACK states received during the set of reference subframes added to the number of other HARQ-ACK states (e.g., DTX state(s), "any" state(s), NACK/DTX state(s)) assigned the same metric value as NACK states. The second quantity can be the total number of possible HARQ-ACK states received from the one or more UEs for a transmission scheduled during the set of reference subframes.

Processor 320 can compare the calculated CWS adjustment metric to a threshold that is a fixed value, or to a configurable threshold (e.g., configurable via higher layer signaling, etc.). In some aspects, the threshold can be a predetermined percentage, such as 80%, or any other value between 0% and 100%.

In some situations, the HARQ messages can be received in response to PDSCH transmitted via more than one unlicensed carrier. In some such aspects, processor 320 can calculate a common CWS adjustment metric that applies to each of the unlicensed carriers and can increase or reset a common CWS based on the common CWS adjustment metric. In other such aspects, processor 320 can calculate a distinct CWS adjustment metric for each of the unlicensed carriers, and can increase or reset a distinct CWS for each of the unlicensed carriers. In some situations involving three or more unlicensed carriers, a combination approach can be employed, with processor 320 calculating a number of CWS adjustment metrics that is less than the number of unlicensed carriers, wherein at least one of the CWS adjustment metrics (along with associated CWS(s)) is associated with more than one unlicensed carrier.

Various embodiments discussed herein are related to CWSA based on HARQ-ACK feedback. One or more UEs can transmit HARQ-ACK feedback information (ACK/NACK/DTX) for a PDSCH (TB) and/or SPS release. An eNB can receive the HARQ-ACK feedback information for the scheduled one or more UEs. The eNB can determine ACK/NACK/DTX states for the scheduled one or more UEs, and can calculate the value of a CWSA metric based on HARQ-ACK feedbacks received from a DL reference subframe set. The eNB can adapt a CWS according to the calculated CWSA metric and a threshold value. The CWS can increased if the CWSA metric is greater than or equal to the threshold. Otherwise, the CWS can reset to a minimum value, which can be available (e.g., 15).

Because at least 4 ms ACK/NACK/DTX report delay from the scheduled PDSCH is indicated for unlicensed CCs in LAA even when HARQ-ACK messages are transmitted on the licensed carrier, the DL reference subframe set can include the first, the last, or all subframes for which HARQ-ACK feedback is available. The threshold value can be either a fixed value (e.g., 10%, 50%, 75%, 80%, 100%, or any other % threshold) or can be configured by the eNB through higher layers in a semi-static manner.

The CWSA metric can be a ratio of the number of valid HARQ-ACK states to the expected HARQ-ACK states from a DL reference subframe set, which can be based on one or more of the PUCCH format, the PDSCH scheduling status and/or the number of unlicensed CCs, as shown in equation 1:

$$\text{CWSA metric} = \frac{\sum_{k=0}^{K-1} X_k / \sum_{k=0}^{K-1}}{\sum_{i=0}^{N_{unlicensed\ CCs,k}^{DL}} O_{i,k}} \quad (1),$$

where $X_k$ denotes the number of valid HARQ-ACK states within a DL reference subframe set for a given UE k corresponding to PDSCH scheduled on unlicensed bands, which can be counted by the eNB as an indicator of UE k experiencing collision due to the presence of a hidden node; $N_{unlicensed\ CCs,k}^{DL}$ denotes the number of CCs configured for a given UE k; and K denotes the number of UEs scheduled within a DL reference subframe set. $O_{i,k}$ has the same meaning as explained below for equation (2).

In some aspects, the CWSA metric can be defined and adapted for each carrier independently, for example, for each CC i, to account for the different congestion conditions for each of the CCs, as shown in equation 2:

$$\text{CWSA metric}(i) = \sum_{k=0}^{K-1} X_k(i) / \sum_{k=0}^{K-1} O_{i,k} \qquad (2),$$

where $O_{i,k}$ denotes, for FDD and for HARQ-ACK bundling window size M=1 in TDD, the total number of transmission blocks scheduled (where HARQ-ACK response(s) for two codewords transmitted on a PDSCH can be considered separately for each codeword) by the eNB for a given UE k on SCell i; and for M>1 in TDD where spatial bundling is applied, $O_{i,k}$ denotes the total number of DL subframes scheduled (where bundled HARQ-ACK responses across M subframes can be considered as M HARQ-ACK responses) by the eNB for a given UE k on SCell i.

In various aspects, the computation of the CWSA metric can conditionally count a variety of HARQ-ACK states as valid HARQ-ACK states and set the associated "X" values used in equation (1) or (2) as "1" correspondingly. These HARQ-ACK states can comprise explicit NACK states, NACK/DTX states and/or DTX states and/or "any" states as supported by the current PUCCH format. NACK/DTX states and/or DTX states and/or "any" states can be included always, or can be included depending on one or more of the type of the corresponding unlicensed CC (e.g., HARQ-ACK DTX from a TB scheduled by a licensed carrier can be ignored) or whether the eNB has scheduled a PDSCH transmission in the associated subframe intended for a given UE or not (e.g., HARQ-ACK DTX from a non-scheduled TB can be ignored).

Figure 4:
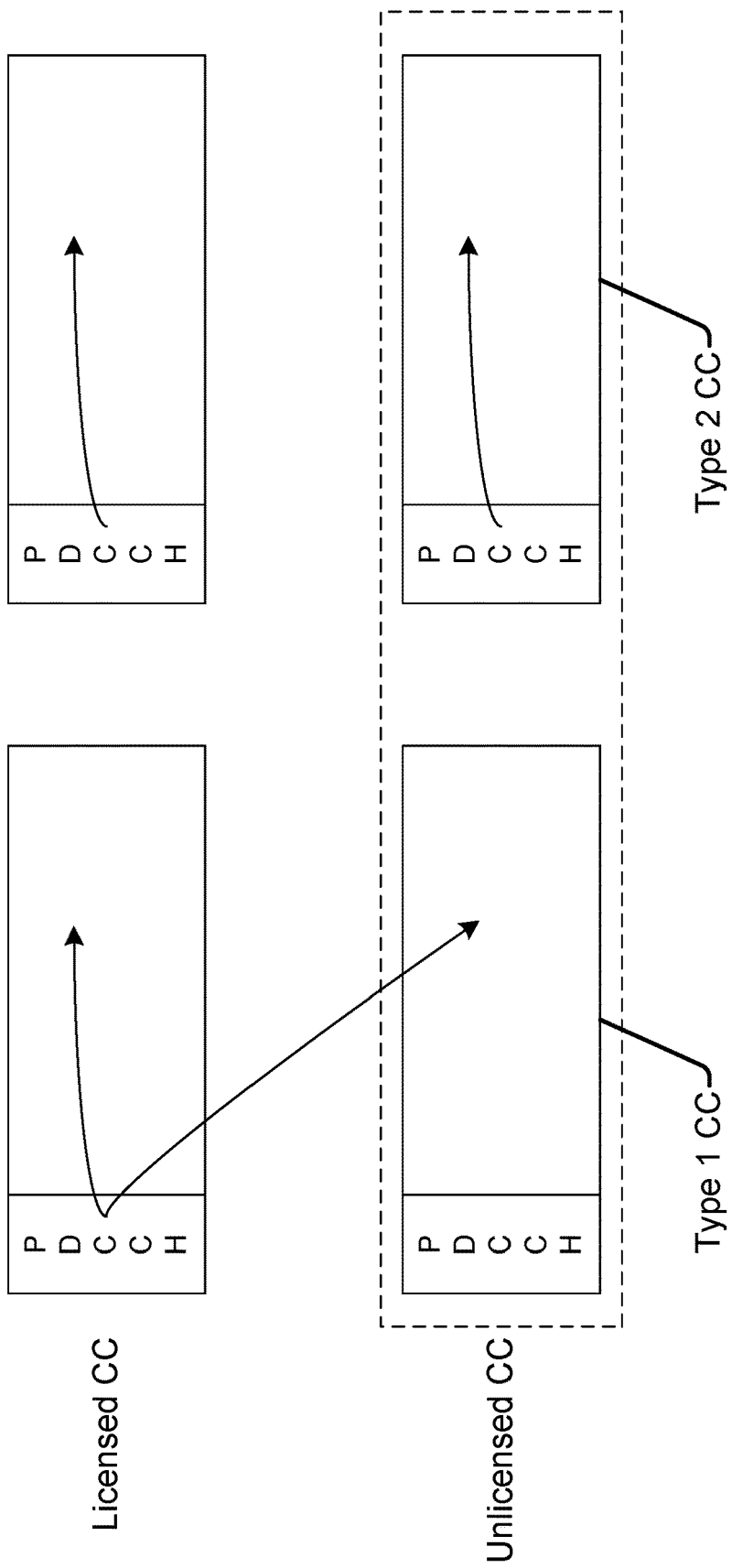
FIG. 4 is a diagram illustrating two different types of unlicensed component carriers, which can potential influence a contention window size (CWS) adjustment metric according to various aspects described herein.

Referring to FIG. 4, illustrated is a diagram showing two different types of unlicensed component carriers, which can potential influence the computation of a contention window size (CWS) adjustment metric according to various aspects described herein. On the left in FIG. 4 an unlicensed CC is a type-1 CC, where PDSCH transmissions on this unlicensed CC are cross-carrier scheduled by (E)PDCCH on a licensed CC. On the right in FIG. 4 an unlicensed CC is a type-2 CC, where PDSCH transmissions on the unlicensed CC are either self-scheduled by (E)PDCCH on the same CC, or are cross-carrier scheduled by (E)PDCCH on another unlicensed CC.

In various aspects, for a given serving cell (e.g., CC) on an unlicensed band in a given subframe n, if a UE k is configured with PUCCH Format 3 or PUCCH format 1b with channel selection, HARQ-ACK states can be counted as described below to compute the CW metric $X_k$.

An explicit "ACK" can be counted as 0, such that $X_k=X_k$.

An explicit "NACK" can be counted as 1, such that $X_k=X_k+1$.

A "NACK/DTX" state can be counted according to either of two options, depending on the embodiment.

According to a first option, "NACK/DTX" can be counted as 1, such that $X_k=X_k+1$. That is, a "NACK/DTX" state can be counted as "NACK" by the eNB for the purpose of calculating the CWSA metric. There is a high probability that "NACK" state is what the UE intends to indicate when the eNB detects a "NACK/DTX" state given PDSCH scheduled by the eNB. This high probability results from the different probabilities between a missed downlink scheduling grant (e.g., around 1%) and a PDSCH fail detection (typically >10%, depending on the eNB scheduler).

According to a second option, "NACK/DTX" state can be counted as 1, such that $X_k=X_k+1$ for a NACK/DTX state if the serving cell is a type-2 CC, and can be counted as 0, such that $X_k=X_k$, otherwise. Compared to the first option, the second option can be beneficial for an LTE system operating on an unlicensed band, as it reduces the probability that the eNB increases its contention window size. Thus, according to the second option the eNB can consider HARQ-ACK feedback (e.g., ACK, NACK, NACK/DTX, any or DTX) only for self-scheduled TB(s) (or TB(s) scheduled via another unlicensed carrier) with NACK/DTX, DTX and "any" states (e.g., as defined for the TDD channel selection case) counted as NACK and correspondingly $X_k=X_k+1$.

An explicit "DTX" state can also be counted according to either of two options. According to a first option, explicit "DTX" state can be counted as 1, such that $X_k=X_k+1$. According to a second option, explicit "DTX" state can be counted as 1, such that $X_k=X_k+1$ for an explicit "DTX" state if the serving cell is a type-2 CC, and can be counted as 0, such that $X_k=X_k$, otherwise.

Similarly, an "any" state can also be counted according to either of two options. According to a first option, an "any" state can be counted as 1, such that $X_k=X_k+1$. According to a second option, an "any" state can be counted as 1, such that $X_k=X_k+1$ for an "any" state if the serving cell is a type-2 CC, and can be counted as 0, such that $X_k=X_k$, otherwise.

If a UE is not scheduled to receive a PDSCH transmission in the subframe n, all HARQ-ACK states, including ACK/NACK/DTX, can be counted as 0, such that $X_k=X_k$.

Although example implementations of techniques for CWSA based on a metric are discussed herein specifically in connection with PUCCH format 1b with channel selection and format 3, in various aspects, the HARQ-ACK state counting techniques for computation of a CWS adjustment metric can extended in a similar manner to situations involved PUCCH formats 1a/1b/2a/2b/Z (where Z is any PUCCH format, including newly introduced PUCCH formats) in various embodiments supporting standalone LAA.

In one example embodiment, the techniques discussed above for computation of the X values (e.g., $X_k$) can be implemented as part of a 3GPP radio access technology (e.g., LTE, LTE-A, a 5G technology, etc.) and incorporated within an associated specification, such as in the following example implementation:

---

Define $N_{unlicensed\ CCs,k}^{DL}$ as the number of unlicensed cells configured by higher layers for the UE k and $B_c^{DL}$ as the number of subframes within a bundling window for which the UE k needs to feed back HARQ-ACK bits for serving cell c.
Set $X_k$= initial value (e.g. 0) - counter of valid HARQ-ACK feedback for CW metric computation.
Set c=0 - cell index: lower indices correspond to lower RRC indices of corresponding cell on unlicensed band.
While $c < N_{unlicensed\ CCs,k}^{DL}$
  set l = 0;
  while $l < B_c^{DL}$;
  - If UE is scheduled to receive PDSCH data transmission in a subframe n,
    o For a explicit "ACK", $X_k = X_k$;
    o For a explicit "NACK", $X_k = X_k + 1$;
    o For a "NACK/DTX" state
      ■ Opt.1: $X_k = X_k + 1$.
      ■ Opt.2: $X_k = X_k + 1$, if serving cell c is type-2 CC; $X_k = X_k$, otherwise.
    o For a explict "DTX" state.
      ■ Opt.1, $X_k = X_k + 1$.
      ■ Opt.2: $X_k = X_k + 1$, if serving cell c is a type-2 CC; $X_k = X_k$, otherwise.
  - Otherwise
    o $X_k = X_k$ for all HARQ-ACK states including ACK/NACK/DTX
  l = l + 1;
  end while
c = c + 1
end while.

Figure 5:
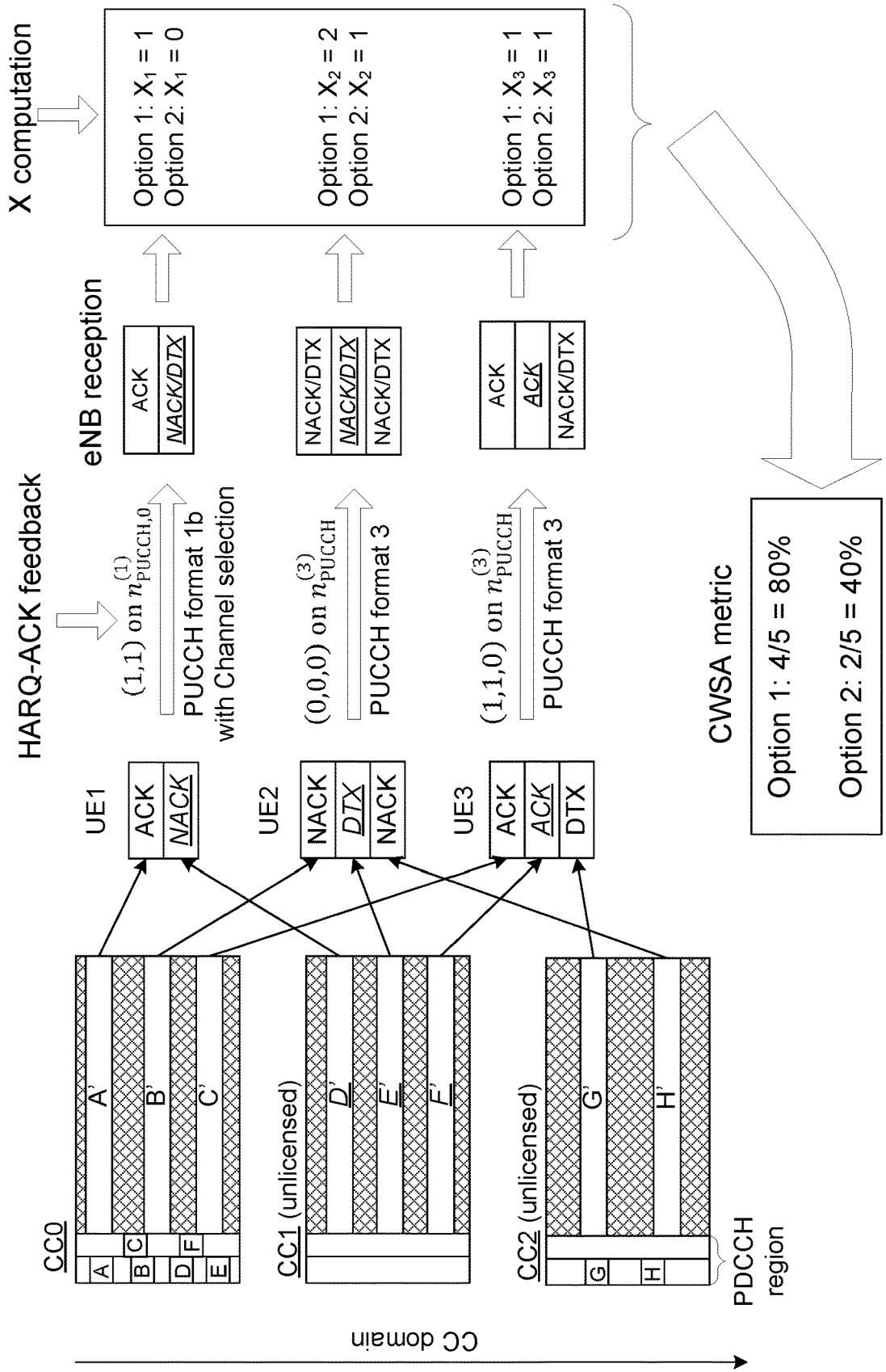
FIG. 5 is a diagram illustrating an example scenario involving computation of a contention window size (CWS) adjustment metric from HARQ (hybrid automatic repeat request)-ACK (acknowledgement) feedback based on either of two options according to various aspects described herein.

Referring to FIG. 5, illustrated is a diagram showing an example scenario involving computation of a contention window size (CWS) adjustment metric from HARQ (hybrid automatic repeat request)-ACK (acknowledgement) feedback based on either of two options according to various aspects described herein. In the example implementation scenario illustrated in FIG. 5, three carriers (CC0, CC1, and CC2) are deployed at an eNB with CC0 on a licensed band, and CC1 and CC2 on an unlicensed band. In this example scenario, three UEs (UE1, UE2, and UE3) are scheduled for PDSCH transmissions with different PUCCH format configurations as follows, where each of the PDSCH transmissions labeled A'-H' is scheduled by the corresponding PDCCH labeled A-H.

UE1 is configured to use PUCCH format 1b with Channel Selection for HARQ-ACK feedback, is configured with CC0 and CC1 (which is a type-1 CC as discussed herein, and for which the corresponding PDSCH, UE HARQ-ACK states, and received HARQ-ACK states are emphasized in FIG. 5), and transmission mode (TM) 2 is employed on CC0 and CC1. In the example scenario depicted, UE 1 successfully decodes PDCCHs A and D and PDSCH A', but fails to successfully decode PDSCH D'. Hence, the HARQ-ACK states {ACK, NACK} is generated and correspondingly (1,1) is transmitted on PUCCH resource $n_{PUCCH,0}^{(1)}$. After detecting this transmission, the receiving eNB knows it corresponds to HARQ-ACK states {ACK, NACK/DTX}. Using the first option discussed herein for handling "NACK/DTX", $X_1=1$, while using the second option for handling "NACK/DTX", $X_1=0$, since CC1 is a type-1 CC.

UE2 and UE3 are both configured to use PUCCH format 3 for HARQ-ACK feedback, and are configured with CC0, CC1 (a type-1 CC) and CC2 (a type-2 CC). TM 2 is employed on CC0, CC1, and CC2.

UE2 misses the PDCCH D on CC0 and does not know the presence of PDSCH D' on CC1. On CC0, UE2 successfully decodes the PDCCH B but fails decoding on PDSCH B' on CC0. On CC2, UE2 successfully decodes PDCCH H but fails decoding PDSCH H'. So, the HARQ-ACK states of {NACK, DTX, NACK} are determined by UE2 according to the decoding result of PDCCH/PDSCHs, and encoded as (0,0,0) and transmitted on $n_{PUCCH}^{(3)}$. After detecting this transmission, the eNB can determine it corresponds to HARQ-ACK states {NACK/DTX, NACK/DTX, NACK/DTX}. Using the first option discussed herein for handling "NACK/DTX" states, $X_1=2$, while using the second option discussed herein, $X_1=1$, since CC1 is a type-1 CC.

UE3 successfully decodes the PDCCH C, PDCCH F and their associated PDSCH C' and F'. However, UE3 misses the PDCCH G (e.g., due to the strong interference from a hidden node, etc.). Thus, UE3 encodes the HARQ-ACK states {ACK, ACK, DTX} was encoded as (1,1,0) transmitted on $n_{PUCCH}^{(3)}$ to report to the eNB. After detecting this HARQ-ACK report, both the first and the second options discussed herein would result in $X_3=1$.

Then, for an example threshold set as 50% (e.g., either fixed in a specification or configured by the eNB by higher layer signaling, the two options would result in different CWSA consequences. Under the first option, the eNB can increase (e.g., double, etc.) the CWS unless it has reached a maximum value, since the CWS adjustment metric under the first option is 80%, which is greater than the 50% threshold. Under the second option, the eNB can reset the CWS to a minimum value (i.e., 15), since the CWS adjustment metric under the first option is 40%, which is less than the threshold value of 50%. As another example, similar results would follow for a threshold value of 80%.

In the same or other aspects, a new definition of DTX can be employed. So In conventional 3GPP systems, HARQ-ACK information (ACK/NACK/DTX) has been defined in UE perspective. In other words, such states can be identified by the UE.

ACK or NACK can be identified by a UE after detecting PDCCH. The UE can try to decode PDSCH upon PDCCH detection so that the UE can figure out ACK/NACK status. DTX can be assumed by a UE when the UE missed PDCCH detection. However, DTX can happen for a UE missing PDCCH detection in one of two scenarios: (1) when the eNB schedules PDSCH with PDCCH, or (2) when the eNB does not schedule PDSCH with PDCCH.

From the UE perspective, the UE may not be able to distinguish between (1) and (2) in FDD CA. In TDD CA, however, the UE may be able to distinguish between (1) and (2) by using the DAI (downlink assignment index).

At the eNB side, although any DTX that is not distinguishable by the UE is received, the eNB can distinguish between scenarios (1) and (2), as the eNB knows the scheduling status for the PDSCH. Thus, counting both NACK and DTX in all scenarios (e.g., as in the unmodified version of option 1 discussed above) can result in the negative performance for a LAA system since the CW size can be adapted even when there is no PDSCH scheduled. Thus, in various aspects, DTX/NACK can be counted for CWS adaptation based on whether the eNB scheduled PDSCH with PDCCH (e.g, counting the DTX/NACK in scenario (1), but not in scenario (2), etc.).

Figure 6:
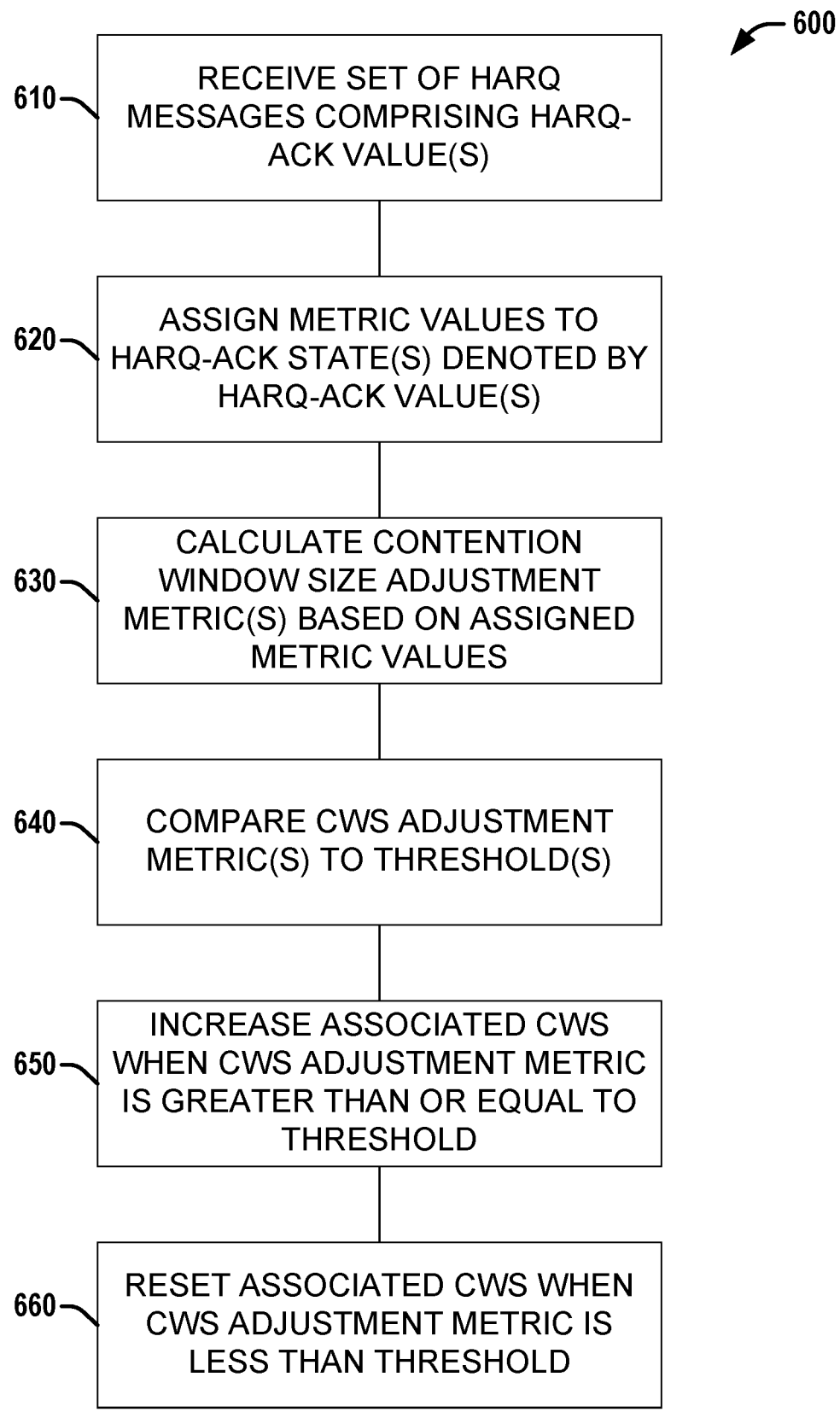
FIG. 6 is a flow diagram illustrating a method that facilitates adjustment of a contention window size (CWS) for license assisted access (LAA) operation according to various aspects described herein.

Referring to FIG. 6, illustrated is a flow diagram of a method 600 that facilitates adjustment of a contention window size (CWS) for license assisted access (LAA) operation according to various aspects described herein. In some aspects, method 600 can be performed at an eNB. In other aspects, a machine readable medium can store instructions associated with method 600 that, when executed, can cause an eNB to perform the acts of method 600.

At 610, a set of HARQ messages can be received, with each HARQ message comprising one or more HARQ-ACK values that denotes a HARQ-ACK state (e.g., ACK/NACK/DTX/"any") for one or more TBs of a LAA transmission. The set of HARQ messages can be one or more HARQ messages received from one or more UEs in response to PDSCH transmission(s) during a set of reference subframes (e.g., the first subframe of a LAA transmission, the first two subframes of a LAA transmission that does not begin aligned with a subframe boundary, etc.).

At 620, a metric value can be assigned to each of the HARQ-ACK states denoted by HARQ-ACK values of the set of HARQ messages. In various aspects, each of the HARQ-ACK states can be assigned either a first value (e.g., a value associated with ACK states, e.g., 0, etc.) or a second value (e.g., a value associated with NACK states, e.g., 1, etc.). As discussed in greater detail above, DTX, NACK/DTX, and "any" states can be assigned either the first value or the second value, depending on various factors (e.g., whether the first option or the second option is implemented, whether values are assigned to NACK/DTX states based on whether an eNB scheduled PDSCH or not for that UE, etc.). In one example, all NACK/DTX and "any" states in response to PDSCH sent via an unlicensed carrier can be assigned the value associated with NACK states. In another example, NACK/DTX and "any" states in response to PDSCH sent via an unlicensed carrier can be assigned the value associated with NACK states only when that PDSCH was scheduled via PDCCH that was transmitted on the same or another unlicensed carrier. HARQ-ACK states in response to PDSCH transmitted via a licensed carrier can be ignored in determination of the CWS adjustment metric. In various aspects, NACK/DTX and "any" states can be treated independently of whether it is in response to a scheduled PDSCH, or alternatively can only be assigned the value associated with NACK states when in response to scheduled PDSCH (and when any other criteria are met, depending on the embodiment).

At 630, one or more contention window size (CWS) adjustment metrics can be calculated based on the metric values assigned to the one or more HARQ-ACK states. In some embodiments, a single CWS adjustment metric can be calculated which applies to all unlicensed carriers over which PDSCH was transmitted to the one or more UEs. In other embodiments, one or more distinct CWS adjustment metrics can be calculated, each of which applies to a distinct unlicensed carrier over which PDSCH was transmitted to the one or more UEs.

In various aspects, each of the one or more CWS adjustment metrics can be a ratio of a first quantity to a second quantity. In aspects, the first quantity can be the sum of the number of NACK states and the number of other states (e.g., DTX, NACK/DTX, or "any") assigned the same metric value as NACK states at 620 from among HARQ-ACK states associated with the relevant unlicensed carrier(s) (e.g., all unlicensed carriers, a single unlicensed carrier, etc.). In aspects, the second quantity can be the number of HARQ-ACK states associated with the relevant unlicensed carrier(s) (or, in some embodiments, the number that are in response to scheduled PDSCH, etc.).

At 640, each of the one or more CWS adjustment metrics can be compared to an associated threshold, which can be predefined (e.g., via a specification, such as 80%, etc.), or semi-statically configured (e.g., via higher layer signaling, etc.). In aspects with more than one CWS adjustment metric, a common threshold can be applied to all of the CWS adjustment metrics, or more than one threshold can be employed.

At 650, for each CWS adjustment metric greater than or equal to its associated threshold, a corresponding CWS can be increased (e.g., to a next larger size, etc.).

At 660, for each CWS adjustment metric less than its associated threshold, a corresponding CWS can be reset (e.g., to a minimum allowed value, such as 15, etc.).

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within an Evolved NodeB (eNB), comprising a processor configured to process one or more hybrid automatic repeat request (HARQ) messages in response to one or more transmissions in one or more reference subframes, wherein each HARQ message comprises one or more HARQ Acknowledgement (HARQ-ACK) values, wherein each of the HARQ-ACK values denotes a HARQ-ACK state to be a discontinuous transmission (DTX) state, an Acknowledgement (ACK) state, a Negative Acknowledgement (NACK) state, or an "any" state for a transport block associated with License Assisted Access (LAA) operation of one or more secondary cells (SCells); determine a metric value for each of the HARQ-ACK states; calculate a contention window size (CWS) adjustment metric based on the determined metric values; increase a CWS to a next higher value when the CWS adjustment (CWSA) metric is greater than or equal to a threshold; and reset the CWS to a minimum when the threshold exceeds the CWSA metric.

Example 2 comprises the subject matter of any variation of example 1, wherein the one or more reference subframes is a starting subframe of a most recent transmission by the eNB on a given channel for which HARQ messages have been received.

Example 3 comprises the subject matter of any variation of example 1, wherein the one or more reference subframes comprise a starting subframe k of a most recent transmission by the eNB on a given channel and a next subframe k+1 when the most recent transmission began in a second slot of the starting subframe k.

Example 4 comprises the subject matter of any variation of any of examples 1-3, wherein HARQ-ACK values associated with distinct codewords are considered separately in calculating the CWS adjustment metric for HARQ messages received in response to PDSCH transmissions that comprise two codewords.

Example 5 comprises the subject matter of any variation of any of examples 1-3, wherein each of the one or more HARQ messages that denotes a bundled HARQ-ACK state across M subframes is considered as M instances of that HARQ-ACK state in calculating the CWS adjustment metric.

Example 6 comprises the subject matter of any variation of any of examples 1-3, wherein the metric value determined for each of the HARQ-ACK states is either a first value associated with the ACK state or a second value associated with the NACK state.

Example 7 comprises the subject matter of any variation of example 6, wherein the first value is 0 and the second value is 1.

Example 8 comprises the subject matter of any variation of any of examples 1-3, wherein the metric values determined for the 'DTX' state and the 'any' state are the same as that determined for the NACK state for each HARQ-ACK state denoted by a HARQ-ACK value of a HARQ message received in response to one of the one or more PDSCH transmissions that was assigned by a physical downlink control channel (PDCCH) or enhanced PDCCH (EPDCCH) transmitted on a same channel as that one of the one or more PDSCH transmissions.

Example 9 comprises the subject matter of any variation of example 8, wherein the metric values determined for the 'DTX' state and for the 'any' state are the same as that for the NACK state.

Example 10 comprises the subject matter of any variation of any of examples 1-3, wherein the CWS adjustment metric is calculated based on a ratio between a first quantity and a second quantity.

Example 11 comprises the subject matter of any variation of example 10, wherein the first quantity is equal to the sum of the number of NACK states and the number of DTX states and "any" states for which a metric value associated with NACK states is determined, and wherein the second quantity is equal to the number of HARQ-ACK states received from the one or more UEs.

Example 12 comprises the subject matter of any variation of any of examples 1-3, wherein the threshold is a fixed value or is configured by the eNB through higher layers.

Example 13 comprises the subject matter of any variation of example 12, wherein the threshold is 80%.

Example 14 comprises the subject matter of any variation of any of examples 1-3, wherein the HARQ-ACK values and the corresponding CWS adjustment metric are associated with a single unlicensed component carrier (CC).

Example 15 comprises the subject matter of any variation of any of examples 1-3, wherein the HARQ-ACK values and the CWS adjustment metric are associated with a plurality of unlicensed component carriers (CCs).

Example 16 comprises the subject matter of any variation of any of examples 1-4, wherein each of the one or more HARQ messages that denotes a bundled HARQ-ACK state across M subframes is considered as M instances of that HARQ-ACK state in calculating the CWS adjustment metric.

Example 17 comprises the subject matter of any variation of any of examples 1-4 or 16, wherein the metric value determined for each of the HARQ-ACK states is either a first value associated with the ACK state or a second value associated with the NACK state.

Example 18 comprises the subject matter of any variation of example 17, wherein the first value is 0 and the second value is 1.

Example 19 comprises the subject matter of any variation of any of examples 1-4 or 16-18, wherein the metric values determined for the 'DTX' state and the 'any' state are the same as that determined for the NACK state for each HARQ-ACK state denoted by a HARQ-ACK value of a HARQ message received in response to one of the one or more PDSCH transmissions that was assigned by a physical downlink control channel (PDCCH) or enhanced PDCCH (EPDCCH) transmitted on a same channel as that one of the one or more PDSCH transmissions.

Example 20 comprises the subject matter of any variation of example 19, wherein the metric values determined for the 'DTX' state and for the 'any' state are the same as that for the NACK state.

Example 21 comprises the subject matter of any variation of any of examples 1-4 or 16-20, wherein the CWS adjustment metric is calculated based on a ratio between a first quantity and a second quantity, wherein the first quantity is equal to the sum of the number of NACK states and the number of DTX states and "any" states for which a metric value associated with NACK states is determined, and wherein the second quantity is equal to the number of HARQ-ACK states received from the one or more UEs.

Example 22 comprises the subject matter of any variation of any of examples 1-4 or 16-21, wherein the threshold is a fixed value or is configured by the eNB through higher layers.

Example 23 comprises the subject matter of any variation of example 22, wherein the threshold is 80%.

Example 24 comprises the subject matter of any variation of example 1, wherein HARQ-ACK values associated with distinct codewords are considered separately in calculating the CWS adjustment metric for HARQ messages received in response to PDSCH transmissions that comprise two codewords.

Example 25 comprises the subject matter of any variation of example 1, wherein each of the one or more HARQ messages that denotes a bundled HARQ-ACK state across M subframes is considered as M instances of that HARQ-ACK state in calculating the CWS adjustment metric.

Example 26 comprises the subject matter of any variation of example 1, wherein the metric value determined for each of the HARQ-ACK states is either a first value associated with the ACK state or a second value associated with the NACK state.

Example 27 comprises the subject matter of any variation of example 26, wherein the first value is 0 and the second value is 1.

Example 28 comprises the subject matter of any variation of example 1, wherein the metric values determined for the 'DTX' state and the 'any' state are the same as that determined for the NACK state for each HARQ-ACK state denoted by a HARQ-ACK value of a HARQ message received in response to one of the one or more PDSCH transmissions that was assigned by a physical downlink control channel (PDCCH) or enhanced PDCCH (EPDCCH) transmitted on a same channel as that one of the one or more PDSCH transmissions.

Example 29 comprises the subject matter of any variation of example 28, wherein the metric values determined for the 'DTX' state and for the 'any' state are the same as that for the NACK state.

Example 30 comprises the subject matter of any variation of example 1, wherein the CWS adjustment metric is calculated based on a ratio between a first quantity and a second quantity.

Example 31 comprises the subject matter of any variation of example 30, wherein the first quantity is equal to the sum of the number of NACK states and the number of DTX states and "any" states for which a metric value associated with NACK states is determined, and wherein the second quantity is equal to the number of HARQ-ACK states received from the one or more UEs.

Example 32 comprises the subject matter of any variation of example 1, wherein the threshold is a fixed value or is configured by the eNB through higher layers.

Example 33 comprises the subject matter of any variation of example 32, wherein the threshold is 80%.

Example 34 comprises the subject matter of any variation of example 1, wherein the HARQ-ACK values and the corresponding CWS adjustment metric are associated with a single unlicensed component carrier (CC).

Example 35 comprises the subject matter of any variation of example 1, wherein the HARQ-ACK values and the CWS adjustment metric are associated with a plurality of unlicensed component carriers (CCs).

Example 36 is a machine readable medium comprising instructions that, when executed, cause an Evolved NodeB (eNB) to: receive one or more hybrid automatic repeat request (HARQ) messages from one or more user equipments (UEs) in response to one or more physical downlink shared channel (PDSCH) transmissions in one or more reference subframes, wherein each HARQ message comprises one or more HARQ Acknowledgement (HARQ-ACK) values denoting a HARQ-ACK state for a transport block associated with License Assisted Access (LAA) operation of one or more secondary cells (SCells), wherein each of the HARQ-ACK states is one of a discontinuous transmission (DTX) state, an Acknowledgement (ACK) state, a Negative Acknowledgement (NACK) state, or an "any" state; assign a corresponding metric value of either a first value or a second value to each HARQ-ACK state denoted by a HARQ-ACK value of a HARQ message; calculate one or more contention window size (CWS) adjustment metrics based on the one or more HARQ messages and on the metric values assigned to the HARQ-ACK states denoted by HARQ-ACK values of the HARQ messages; compare each of the one or more CWS adjustment metrics to a threshold; increase at least one associated CWS to a next higher allowed value when at least one of the one or more CWS adjustment metrics is greater than or equal to the threshold; and reset the at least one associated CWS to a minimum allowed value when at least one of the one or more CWS adjustment metrics is less than the threshold.

Example 37 comprises the subject matter of any variation of example 36, wherein, for each HARQ-ACK message that is in response to a physical downlink shared channel (PDSCH) transmission scheduled via a licensed component carrier (CC), the first value is assigned to each HARQ-ACK state denoted by a HARQ-ACK value of that HARQ-ACK message.

Example 38 comprises the subject matter of any variation of any of examples 36-37, wherein, for each HARQ-ACK message that is in response to a physical downlink shared channel (PDSCH) transmission scheduled via an unlicensed component carrier (CC), the second value is assigned to each NACK state, DTX state, or "any" state denoted by a HARQ-ACK value of that HARQ message.

Example 39 comprises the subject matter of any variation of any of examples 36-37, wherein the second value is assigned to each DTX state denoted by a HARQ-ACK value of a HARQ message corresponding to a PDSCH transmission of the one or more PDSCH transmissions that was scheduled by the eNB.

Example 40 comprises the subject matter of any variation of any of examples 36-37, wherein, each of the one or more PDSCH transmissions was transmitted via an unlicensed component carrier (CC).

Example 41 comprises the subject matter of any variation of any of examples 36-37, wherein the first value is 0 and the second value is 1.

Example 42 comprises the subject matter of any variation of example 41, wherein the CWS adjustment metric is based on a ratio between a first quantity and a second quantity, wherein the first quantity is equal to the sum of the number of NACK states and the number of DTX and "any" states for which the second value is assigned, and wherein the second quantity is equal to the number of HARQ-ACK states received from the one or more UEs during a set of one or more reference subframes.

Example 43 comprises the subject matter of any variation of example 42, wherein the set of one or more reference subframes is a starting subframe during which HARQ messages are received from the UEs in response to a given transmission.

Example 44 comprises the subject matter of any variation of any of examples 36-37, wherein the one or more HARQ-ACK messages are received via one or more unlicensed component carriers (CCs), wherein the one or more CWS adjustment metrics is a single CWS adjustment metric associated with each of the one or more unlicensed CCs, and wherein the one or more CWSs is a single CWS associated with each of the one or more unlicensed CCs.

Example 45 comprises the subject matter of any variation of any of examples 36-37, wherein the one or more HARQ-ACK messages are received via a plurality of unlicensed component carriers (CCs), wherein the one or more CWS adjustment metrics comprise a plurality of CWS adjustment metrics, wherein the one or more CWSs comprise a plurality of CWSs, and wherein each CC of the plurality of CCs is associated with a distinct CWS adjustment metric of the plurality of CWS adjustment metrics and a distinct CWS of the plurality of CWSs.

Example 46 comprises the subject matter of any variation of example 36, wherein, for each HARQ-ACK message that is in response to a physical downlink shared channel (PDSCH) transmission scheduled via an unlicensed component carrier (CC), the second value is assigned to each NACK state, DTX state, or "any" state denoted by a HARQ-ACK value of that HARQ message.

Example 47 comprises the subject matter of any variation of example 36, wherein the second value is assigned to each DTX state denoted by a HARQ-ACK value of a HARQ message corresponding to a PDSCH transmission of the one or more PDSCH transmissions that was scheduled by the eNB.

Example 48 comprises the subject matter of any variation of example 36, wherein, each of the one or more PDSCH transmissions was transmitted via an unlicensed component carrier (CC).

Example 49 comprises the subject matter of any variation of example 36, wherein the first value is 0 and the second value is 1.

Example 50 comprises the subject matter of any variation of example 49, wherein the CWS adjustment metric is based on a ratio between a first quantity and a second quantity, wherein the first quantity is equal to the sum of the number of NACK states and the number of DTX and "any" states for which the second value is assigned, and wherein the second quantity is equal to the number of HARQ-ACK states received from the one or more UEs during a set of one or more reference subframes.

Example 51 comprises the subject matter of any variation of example 50, wherein the set of one or more reference subframes is a starting subframe during which HARQ messages are received from the UEs in response to a given transmission.

Example 52 comprises the subject matter of any variation of example 36, wherein the one or more HARQ-ACK messages are received via one or more unlicensed component carriers (CCs), wherein the one or more CWS adjustment metrics is a single CWS adjustment metric associated with each of the one or more unlicensed CCs, and wherein the one or more CWSs is a single CWS associated with each of the one or more unlicensed CCs.

Example 53 comprises the subject matter of any variation of example 36, wherein the one or more HARQ-ACK messages are received via a plurality of unlicensed component carriers (CCs), wherein the one or more CWS adjustment metrics comprise a plurality of CWS adjustment metrics, wherein the one or more CWSs comprise a plurality of CWSs, and wherein each CC of the plurality of CCs is associated with a distinct CWS adjustment metric of the plurality of CWS adjustment metrics and a distinct CWS of the plurality of CWSs.

Example 54 is an apparatus configured to be employed within an Evolved NodeB (eNB), comprising receiver circuitry and a processor. The receiver circuitry is configured to receive a set of set of hybrid automatic repeat request (HARQ) messages from one or more user equipments (UEs) in response to one or more physical downlink shared channel (PDSCH) transmissions during one or more reference subframes, wherein each HARQ message of the set of HARQ messages comprises one or more HARQ Acknowledgement (HARQ-ACK) values, wherein each HARQ-ACK value denotes a HARQ-ACK state for a transport block associated with License Assisted Access (LAA) operation of one or more secondary cells (SCells), wherein each of the HARQ-ACK states is one of an acknowledgement (ACK) state, a Negative Acknowledgement (NACK) state, a discontinuous transmission (DTX) state, or an "any" state. The processor is configured to: determine a metric value for each HARQ-ACK state; calculate a contention window size (CWS) adjustment metric based on a ratio between a first quantity and a second quantity, wherein the first quantity is equal to the sum of the number of NACK states with the number of DTX states and "any" states for which the determined metric value is a value associated with NACK states, wherein the second quantity is equal to the number of possible HARQ-ACK states received from the one or more UEs during the one or more reference subframe; increase a CWS to a next higher allowed value when the CWS adjustment metric is greater than or equal to a threshold; and reset the CWS to a minimum allowed value when the CWS adjustment metric is less than the threshold.

Example 55 comprises the subject matter of any variation of example 54, wherein the one or more reference subframes is a starting subframe of a most recent transmission for which HARQ messages are received from the one or more UEs.

Example 56 comprises the subject matter of any variation of any of examples 54-55, wherein the threshold is a fixed value.

Example 57 comprises the subject matter of any variation of example 56, wherein the threshold is 80%.

Example 58 comprises the subject matter of any variation of example 54, wherein the number of DTX states for which the determined metric value is the value associated with NACK states is equal to the number of DTX states denoted by HARQ-ACK values of HARQ messages received in response to physical downlink shared channel (PDSCH) messages scheduled by the eNB via an unlicensed carrier.

Example 59 comprises the subject matter of any variation of example 54, wherein the threshold is a fixed value.

Example 60 is a method configured to be employed within an Evolved NodeB (eNB), comprising: receiving one or more hybrid automatic repeat request (HARQ) messages from one or more user equipments (UEs) in response to one or more physical downlink shared channel (PDSCH) transmissions in one or more reference subframes, wherein each HARQ message comprises one or more HARQ Acknowledgement (HARQ-ACK) values denoting a HARQ-ACK state for a transport block associated with License Assisted Access (LAA) operation of one or more secondary cells (SCells), wherein each of the HARQ-ACK states is one of a discontinuous transmission (DTX) state, an Acknowledgement (ACK) state, a Negative Acknowledgement (NACK) state, or an "any" state; assigning a corresponding metric value of either a first value or a second value to each HARQ-ACK state denoted by a HARQ-ACK value of a HARQ message; calculating one or more contention window size (CWS) adjustment metrics based on the one or more HARQ messages and on the metric values assigned to the HARQ-ACK states denoted by HARQ-ACK values of the HARQ messages; comparing each of the one or more CWS adjustment metrics to a threshold; increasing at least one associated CWS to a next higher allowed value when at least one of the one or more CWS adjustment metrics is greater than or equal to the threshold; and resetting the at least one associated CWS to a minimum allowed value when at least one of the one or more CWS adjustment metrics is less than the threshold.

Example 61 comprises the subject matter of any variation of example 60, wherein, for each HARQ-ACK message that is in response to a physical downlink shared channel (PDSCH) transmission scheduled via a licensed component carrier (CC), the first value is assigned to each HARQ-ACK state denoted by a HARQ-ACK value of that HARQ-ACK message.

Example 62 comprises the subject matter of any variation of any of examples 60-61, wherein, for each HARQ-ACK message that is in response to a physical downlink shared channel (PDSCH) transmission scheduled via an unlicensed component carrier (CC), the second value is assigned to each NACK state, DTX state, or "any" state denoted by a HARQ-ACK value of that HARQ message.

Example 63 comprises the subject matter of any variation of any of examples 60-61, wherein the second value is assigned to each DTX state denoted by a HARQ-ACK value of a HARQ message corresponding to a PDSCH transmission of the one or more PDSCH transmissions that was scheduled by the eNB.

Example 64 comprises the subject matter of any variation of any of examples 60-61, wherein, each of the one or more PDSCH transmissions was transmitted via an unlicensed component carrier (CC).

Example 65 comprises the subject matter of any variation of any of examples 60-61, wherein the first value is 0 and the second value is 1.

Example 66 comprises the subject matter of any variation of example 65, wherein the CWS adjustment metric is based on a ratio between a first quantity and a second quantity, wherein the first quantity is equal to the sum of the number of NACK states and the number of DTX and "any" states for which the second value is assigned, and wherein the second quantity is equal to the number of HARQ-ACK states received from the one or more UEs during a set of one or more reference subframes.

Example 67 comprises the subject matter of any variation of example 66, wherein the set of one or more reference subframes is a starting subframe during which HARQ messages are received from the UEs in response to a given transmission.

Example 68 comprises the subject matter of any variation of example 60-61, wherein the one or more HARQ-ACK messages are received via one or more unlicensed component carriers (CCs), wherein the one or more CWS adjustment metrics is a single CWS adjustment metric associated with each of the one or more unlicensed CCs, and wherein the one or more CWSs is a single CWS associated with each of the one or more unlicensed CCs.

Example 69 comprises the subject matter of any variation of example 60-61, wherein the one or more HARQ-ACK messages are received via a plurality of unlicensed component carriers (CCs), wherein the one or more CWS adjustment metrics comprise a plurality of CWS adjustment metrics, wherein the one or more CWSs comprise a plurality of CWSs, and wherein each CC of the plurality of CCs is associated with a distinct CWS adjustment metric of the plurality of CWS adjustment metrics and a distinct CWS of the plurality of CWSs.

Example 70 is an apparatus configured to be employed within an Evolved NodeB (eNB), comprising means for receiving and means for processing. The means for receiving is configured to receive a set of set of hybrid automatic repeat request (HARQ) messages from one or more user equipments (UEs) in response to one or more physical downlink shared channel (PDSCH) transmissions during one or more reference subframes, wherein each HARQ message of the set of HARQ messages comprises one or more HARQ Acknowledgement (HARQ-ACK) values, wherein each HARQ-ACK value denotes a HARQ-ACK state for a transport block associated with License Assisted Access (LAA) operation of one or more secondary cells (SCells), wherein each of the HARQ-ACK states is one of an acknowledgement (ACK) state, a Negative Acknowledgement (NACK) state, a discontinuous transmission (DTX) state, or an "any" state. The means for processing is configured to: determine a metric value for each HARQ- ACK state; calculate a contention window size (CWS) adjustment metric based on a ratio between a first quantity and a second quantity, wherein the first quantity is equal to the sum of the number of NACK states with the number of DTX states and "any" states for which the determined metric value is a value associated with NACK states, wherein the second quantity is equal to the number of possible HARQ-ACK states received from the one or more UEs during the one or more reference subframe; increase a CWS to a next higher allowed value when the CWS adjustment metric is greater than or equal to a threshold; and reset the CWS to a minimum allowed value when the CWS adjustment metric is less than the threshold.

Example 71 comprises the subject matter of any variation of example 70, wherein the one or more reference subframes is a starting subframe of a most recent transmission for which HARQ messages are received from the one or more UEs.

Example 72 comprises the subject matter of any variation of example 70-71, wherein the threshold is a fixed value.

Example 73 comprises the subject matter of any variation of example 72, wherein the threshold is 80%.

Example 74 comprises the subject matter of any variation of example 70, wherein the number of DTX states for which the determined metric value is the value associated with NACK states is equal to the number of DTX states denoted by HARQ-ACK values of HARQ messages received in response to physical downlink shared channel (PDSCH) messages scheduled by the eNB via an unlicensed carrier.

Example 75 is an apparatus configured to be employed within an Evolved NodeB (eNB), comprising means for receiving and means for processing. The means for receiving is configured to receive one or more hybrid automatic repeat request (HARQ) messages from one or more user equipments (UEs) in response to one or more physical downlink shared channel (PDSCH) transmissions in one or more reference subframes, wherein each HARQ message comprises one or more HARQ Acknowledgement (HARQ-ACK) values, wherein each of the HARQ-ACK values denotes a HARQ-ACK state for a transport block associated with License Assisted Access (LAA) operation of one or more secondary cells (SCells), wherein each of the HARQ-ACK states is one of a discontinuous transmission (DTX) state, an Acknowledgement (ACK) state, a Negative Acknowledgement (NACK) state, or an "any" state. The means for processing is configured to: determine a metric value for each of the HARQ-ACK states; calculate a contention window size (CWS) adjustment metric based on the determined metric values; increase a CWS to a next higher allowed value when the CWS adjustment metric is greater than or equal to a threshold; and reset the CWS to a minimum allowed value when the CWS adjustment metric is less than the threshold.

Example 76 comprises the subject matter of any variation of example 75, wherein the one or more reference subframes is a starting subframe of a most recent transmission by the eNB on a given channel for which HARQ messages have been received.

Example 77 comprises the subject matter of any variation of example 75, wherein the one or more reference subframes comprise a starting subframe k of a most recent transmission by the eNB on a given channel and a next subframe k+1 when the most recent transmission began in a second slot of the starting subframe k.

Example 78 comprises the subject matter of any variation of any of examples 75-77, wherein HARQ-ACK values associated with distinct codewords are considered separately in calculating the CWS adjustment metric for HARQ messages received in response to PDSCH transmissions that comprise two codewords.

Example 79 comprises the subject matter of any variation of any of examples 75-77, wherein each of the one or more HARQ messages that denotes a bundled HARQ-ACK state across M subframes is considered as M instances of that HARQ-ACK state in calculating the CWS adjustment metric.

Example 80 comprises the subject matter of any variation of any of examples 75-77, wherein the metric value determined for each of the HARQ-ACK states is either a first value associated with the ACK state or a second value associated with the NACK state.

Example 81 comprises the subject matter of any variation of example 80, wherein the first value is 0 and the second value is 1.

Example 82 comprises the subject matter of any variation of any of examples 75-77, wherein the metric values determined for the 'DTX' state and the 'any' state are the same as that determined for the NACK state for each HARQ-ACK state denoted by a HARQ-ACK value of a HARQ message received in response to one of the one or more PDSCH transmissions that was assigned by a physical downlink control channel (PDCCH) or enhanced PDCCH (EPDCCH) transmitted on a same channel as that one of the one or more PDSCH transmissions.

Example 83 comprises the subject matter of any variation of example 82, wherein the metric values determined for the 'DTX' state and for the 'any' state are the same as that for the NACK state.

Example 84 comprises the subject matter of any variation of any of examples 75-77, wherein the CWS adjustment metric is calculated based on a ratio between a first quantity and a second quantity.

Example 85 comprises the subject matter of any variation of any of examples 1-35, wherein the processor is a baseband processor.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A non-transitory machine readable medium comprising instructions that, when executed, cause a Base Station (BS) to:
   receive a set of set of hybrid automatic repeat request (HARQ) messages from one or more user equipments (UEs) in response to one or more physical downlink shared channel (PDSCH) transmissions during one or more reference subframes, wherein each HARQ message of the set of HARQ messages comprises one or more HARQ Acknowledgement (HARQ-ACK) values, wherein each HARQ-ACK value denotes a HARQ-ACK state for a transmission associated with License Assisted Access (LAA) operation of one or more secondary cells (SCells), wherein each of the HARQ-ACK states is one of an acknowledgement (ACK) state, a Negative Acknowledgement (NACK) state, a discontinuous transmission (DTX) state, or an "any" state;
   determine, for each of the one or more HARQ-ACK values that denotes the HARQ-ACK state to be one of the DTX state, the NACK/DTX state, or the "any" state, whether to count that HARQ-ACK value as the ACK state, to count that HARQ-ACK value as the NACK state, or to ignore that HARQ-ACK value;
   calculate a percentage of the one or more HARQ-ACK values that denote the ACK state or are counted as the ACK state;
   increase a Contention Window Size (CWS) to a next higher value when the percentage of the one or more HARQ-ACK values that denote the ACK state or are counted as the ACK state is less than 10%; and
   reset the CWS to a minimum when the percentage of the one or more HARQ-ACK values that one of denote the ACK state or are counted as the ACK state is at least 10%.

2. The non-transitory machine readable medium of claim 1, wherein the one or more reference subframes is a starting subframe of a most recent transmission for which HARQ messages are received from the one or more UEs.

3. The non-transitory machine readable medium of claim 1, wherein, for each DTX state denoted by a HARQ-ACK value of a HARQ message received in response to a physical downlink shared channel (PDSCH) message scheduled by the BS via an unlicensed carrier, that DTX state is counted as the NACK state.

4. The non-transitory machine readable medium of claim 1, wherein the one or more reference subframes comprise a starting subframe k of a most recent transmission by the BS on a given channel and a next subframe k+1 when the most recent transmission began in a second slot of two slots of the starting subframe k wherein k is an integer.

5. The non-transitory machine readable medium of claim 1, wherein HARQ-ACK values associated with distinct codewords are considered separately in calculating the percentage of the one or more HARQ-ACK values that one of denote the NACK state or are counted as the NACK state for HARQ messages received in response to Physical Downlink Shared Channel (PDSCH) transmissions that comprise two codewords.

6. The non-transitory machine readable medium of claim 1, wherein each of the one or more HARQ messages that denotes a bundled HARQ-ACK state across M subframes, wherein M is two or more, is considered as M instances of the HARQ-ACK value of a HARQ-ACK state in calculating the percentage of the one or more HARQ-ACK values that denote the NACK state or are counted as the NACK state.

7. The non-transitory machine readable medium of claim 1, wherein the instructions, when executed, further cause the BS to determine that the DTX state and the "any" state are counted as the NACK state for each HARQ-ACK state denoted by a HARQ-ACK value of a HARQ message received in response to one or more Physical Downlink Shared Channel (PDSCH) transmissions that was assigned by a physical downlink control channel (PDCCH) or enhanced PDCCH (EPDCCH) transmitted on a same channel as that one of the one or more PDSCH transmissions.

8. The non-transitory machine readable medium of claim 7, wherein the instructions, when executed, further cause the BS to determine that the DTX state and the "any" state are counted as the NACK state.

9. The non-transitory machine readable medium of claim 1, wherein the HARQ-ACK values and the percentage of the one or more HARQ-ACK values that denote the NACK state or are counted as the NACK state are associated with a single unlicensed component carrier (CC).

10. The non-transitory machine readable medium of claim 1, wherein the HARQ-ACK values and the percentage of the one or more HARQ-ACK values that one of denote the NACK state or are counted as the NACK state are associated with a plurality of unlicensed component carriers (CCs).

11. A Base Station (BS), comprising:
    a memory; and
    one or more processors configured to:
       process one or more hybrid automatic repeat request (HARQ) messages in response to a set of set of hybrid automatic repeat request (HARQ) messages from one or more user equipments (UEs) in response to one or more physical downlink shared channel (PDSCH) transmissions during one or more reference subframes, wherein each HARQ message of the set of HARQ messages comprises one or more HARQ Acknowledgement (HARQ-ACK) values, wherein each HARQ-ACK value denotes a HARQ-ACK state for a transmission associated with License Assisted Access (LAA) operation of one or more secondary cells (SCells), wherein each of the HARQ-ACK states is one of an acknowledgement (ACK) state, a Negative Acknowledgement (NACK) state, a discontinuous transmission (DTX) state, or an "any" state;
       determine, for each of the one or more HARQ-ACK values that denotes the HARQ-ACK state to be one of the DTX state, the NACK/DTX state, or the "any" state, whether to count that HARQ-ACK value as the ACK state, to count that HARQ-ACK value as the NACK state, or to ignore that HARQ-ACK value;
       calculate a percentage of the one or more HARQ-ACK values that denote the ACK state or are counted as the ACK state;
       increase a Contention Window Size (CWS) to a next higher value when the percentage of the one or more HARQ-ACK values that denote the ACK state or are counted as the ACK state is less than 10%; and
       reset the CWS to a minimum when the percentage of the one or more HARQ-ACK values that one of denote the ACK state or are counted as the ACK state is at least 10%.

12. The BS of claim 11, wherein the one or more reference subframes is a starting subframe of a most recent transmission for which HARQ messages are received from the one or more UEs.

13. The BS of claim 11, wherein, for each DTX state denoted by a HARQ-ACK value of a HARQ message received in response to a physical downlink shared channel (PDSCH) message scheduled by the BS via an unlicensed carrier, that DTX state is counted as the NACK state.

14. The BS of claim 11, wherein the one or more reference subframes comprise a starting subframe k of a most recent transmission by the BS on a given channel and a next subframe k+1 when the most recent transmission began in a second slot of two slots of the starting subframe k wherein k is an integer.

15. The BS of claim 11, wherein HARQ-ACK values associated with distinct codewords are considered separately in calculating the percentage of the one or more HARQ-ACK values that one of denote the NACK state or are counted as the NACK state for HARQ messages received in response to Physical Downlink Shared Channel (PDSCH) transmissions that comprise two codewords.

16. The BS of claim 11, wherein each of the one or more HARQ messages that denotes a bundled HARQ-ACK state across M subframes, wherein M is two or more, is considered as M instances of the HARQ-ACK value of a HARQ-ACK state in calculating the percentage of the one or more HARQ-ACK values that denote the NACK state or are counted as the NACK state.

17. The BS of claim 11, wherein the one or more processors are further configured to determine that the DTX state and the "any" state are counted as the NACK state for each HARQ-ACK state denoted by a HARQ-ACK value of a HARQ message received in response to one or more Physical Downlink Shared Channel (PDSCH) transmissions that was assigned by a physical downlink control channel (PDCCH) or enhanced PDCCH (EPDCCH) transmitted on a same channel as that one of the one or more PDSCH transmissions.

18. The BS of claim 17, wherein the one or more processors are further configured to determine that the DTX state and the "any" state are counted as the NACK state.

19. The BS of claim 11, wherein the HARQ-ACK values and the percentage of the one or more HARQ-ACK values that denote the NACK state or are counted as the NACK state are associated with a single unlicensed component carrier (CC).

20. The BS of claim 11, wherein the HARQ-ACK values and the percentage of the one or more HARQ-ACK values that one of denote the NACK state or are counted as the NACK state are associated with a plurality of unlicensed component carriers (CCs).

21. A method employable at a Base Station (BS), comprising:
receiving a set of set of hybrid automatic repeat request (HARQ) messages from one or more user equipments (UEs) in response to one or more physical downlink shared channel (PDSCH) transmissions during one or more reference subframes, wherein each HARQ message of the set of HARQ messages comprises one or more HARQ Acknowledgement (HARQ-ACK) values, wherein each HARQ-ACK value denotes a HARQ-ACK state for a transmission associated with License Assisted Access (LAA) operation of one or more secondary cells (SCells), wherein each of the HARQ-ACK states is one of an acknowledgement (ACK) state, a Negative Acknowledgement (NACK) state, a discontinuous transmission (DTX) state, or an "any" state;
determining, for each of the one or more HARQ-ACK values that denotes the HARQ-ACK state to be one of the DTX state, the NACK/DTX state, or the "any" state, whether to count that HARQ-ACK value as the ACK state, to count that HARQ-ACK value as the NACK state, or to ignore that HARQ-ACK value;
calculating a percentage of the one or more HARQ-ACK values that denote the ACK state or are counted as the ACK state;
increasing a Contention Window Size (CWS) to a next higher value when the percentage of the one or more HARQ-ACK values that denote the ACK state or are counted as the ACK state is less than 10%; and
resetting the CWS to a minimum when the percentage of the one or more HARQ-ACK values that one of denote the ACK state or are counted as the ACK state is at least 10%.

22. The method of claim 21, wherein the one or more reference subframes is a starting subframe of a most recent transmission for which HARQ messages are received from the one or more UEs.

23. The method of claim 21, wherein, for each DTX state denoted by a HARQ-ACK value of a HARQ message received in response to a physical downlink shared channel (PDSCH) message scheduled by the BS via an unlicensed carrier, that DTX state is counted as the NACK state.

24. The method of claim 21, wherein the one or more reference subframes comprise a starting subframe k of a most recent transmission by the BS on a given channel and a next subframe k+1 when the most recent transmission began in a second slot of two slots of the starting subframe k wherein k is an integer.

25. The method of claim 21, wherein HARQ-ACK values associated with distinct codewords are considered separately in calculating the percentage of the one or more HARQ-ACK values that one of denote the NACK state or are counted as the NACK state for HARQ messages received in response to Physical Downlink Shared Channel (PDSCH) transmissions that comprise two codewords.

26. The method of claim 21, wherein each of the one or more HARQ messages that denotes a bundled HARQ-ACK state across M subframes, wherein M is two or more, is considered as M instances of the HARQ-ACK value of a HARQ-ACK state in calculating the percentage of the one or more HARQ-ACK values that denote the NACK state or are counted as the NACK state.

27. The method of claim 21, further comprising determining that the DTX state and the "any" state are counted as the NACK state for each HARQ-ACK state denoted by a HARQ-ACK value of a HARQ message received in response to one or more Physical Downlink Shared Channel (PDSCH) transmissions that was assigned by a physical downlink control channel (PDCCH) or enhanced PDCCH (EPDCCH) transmitted on a same channel as that one of the one or more PDSCH transmissions.

28. The method of claim 27, further comprising determining that the DTX state and the "any" state are counted as the NACK state.

29. The method of claim 21, wherein the HARQ-ACK values and the percentage of the one or more HARQ-ACK values that denote the NACK state or are counted as the NACK state are associated with a single unlicensed component carrier (CC).

30. The method of claim 21, wherein the HARQ-ACK values and the percentage of the one or more HARQ-ACK values that one of denote the NACK state or are counted as the NACK state are associated with a plurality of unlicensed component carriers (CCs).

\* \* \* \* \*